United States Patent [19]

Johnson et al.

[11] Patent Number: 5,102,287

[45] Date of Patent: Apr. 7, 1992

[54] PLATE HANDLING APPARATUS

[75] Inventors: David A. Johnson; Thomas J. Hammer, both of Corvallis, Oreg.

[73] Assignee: Tekmax Inc., Tangent, Oreg.

[21] Appl. No.: 579,859

[22] Filed: Sep. 6, 1990

[51] Int. Cl.$^5$ ............................................. C25D 17/00
[52] U.S. Cl. ................................... 414/618; 294/87.1; 294/116; 414/626; 414/753
[58] Field of Search ............... 414/416, 750, 751, 753, 414/618, 626, 736, 592; 294/87.1, 116

[56] References Cited

U.S. PATENT DOCUMENTS

| | | | |
|---|---|---|---|
| 1,601,868 | 10/1926 | Luce | 294/87.1 X |
| 2,524,880 | 10/1950 | Cattonar et al. | 294/116 X |
| 3,012,811 | 12/1961 | Sandrock | 294/116 X |
| 3,495,722 | 2/1970 | Schroder | 294/87.1 X |
| 3,633,766 | 1/1972 | Byam et al. | 414/626 |
| 4,211,123 | 7/1980 | Mack | 294/116 X |
| 4,383,795 | 5/1983 | Wakamatsu et al. | 294/87.1 X |
| 4,824,307 | 4/1989 | Johnson et al. | 414/798.2 |

FOREIGN PATENT DOCUMENTS

| | | | |
|---|---|---|---|
| 752262 | 1/1967 | Canada | 294/87.1 |
| 462247 | 1/1914 | France | 294/116 |

Primary Examiner—Frank E. Werner
Assistant Examiner—James Eller
Attorney, Agent, or Firm—Chernoff, Vilhauer, McClung & Stenzel

[57] ABSTRACT

A plate handling apparatus grips a group of vertically oriented stacks of plates that are being transported serially, lifts them out of the pockets they are being transported in, reduces the separation between them, moves them to a remote location and deposits them for further processing. In addition, the apparatus picks up the stacks in two groups that are 180° opposed from one another with the stacks in one group being interposed with the stacks in the other group. The stacks of plates are engaged by gripping heads that employ paired cam elements carrying gripping fingers. The cam elements have two separate cam faces that permits them to be positively opened and closed by linear movement of a cam follower that fits between the cam elements and engages the cam faces. The set of cam faces used to open the fingers has a steeper ramp angle than the set used to close the fingers. Accordingly, the fingers are opened quicker than they are closed and a greater pressure is exerted upon closing. The set of cam faces used to close the fingers is arranged so that loss of fluid to the actuator that moves the cam follower does not cause the fingers to release their load.

7 Claims, 4 Drawing Sheets

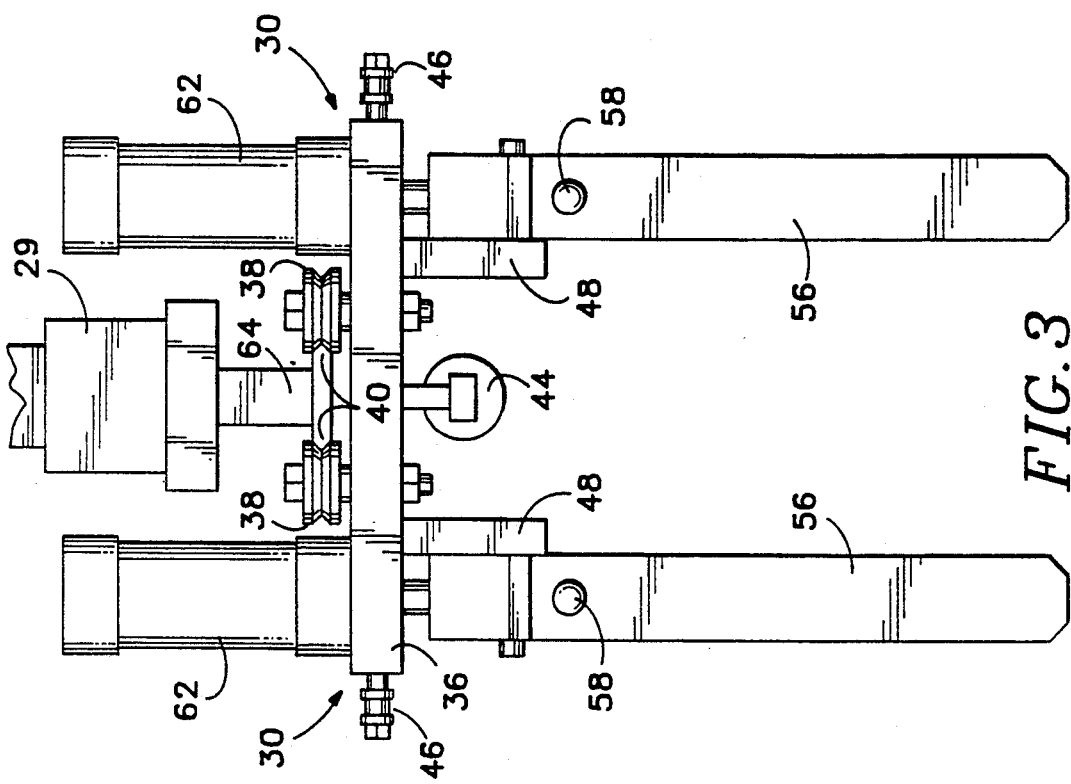
FIG. 3
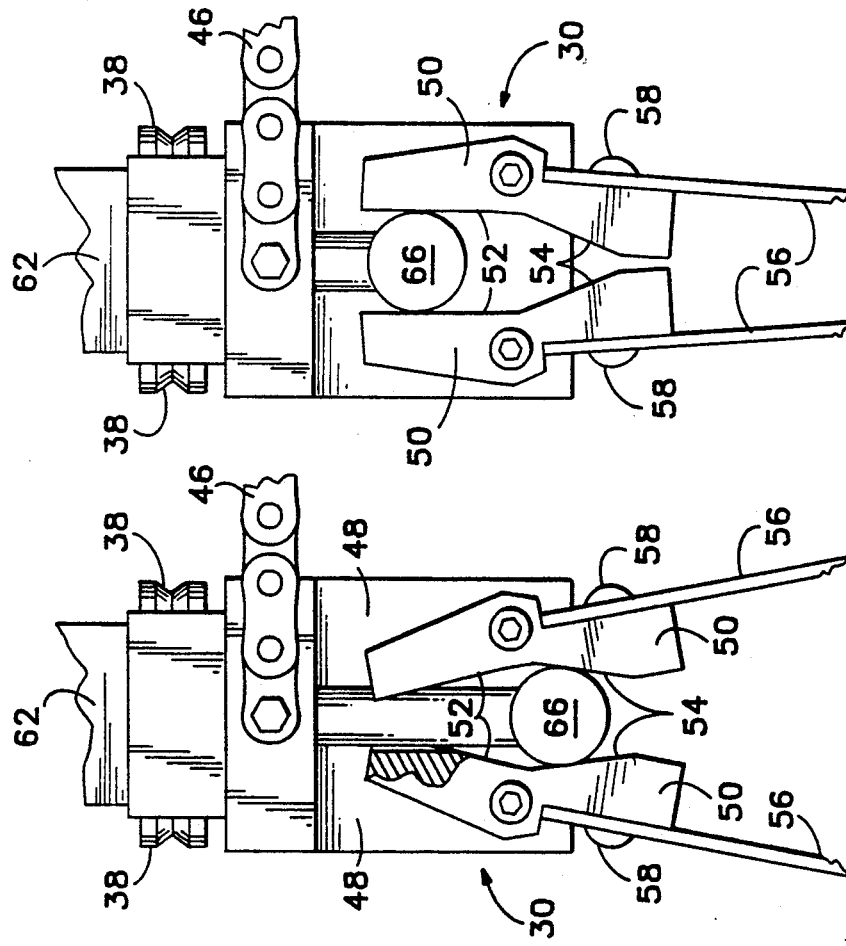
FIG. 6
FIG. 5

PLATE HANDLING APPARATUS

BACKGROUND AND SUMMARY OF THE INVENTION

This invention relates to an apparatus for lifting a group of vertically oriented stacks of battery plates out of a stacking apparatus and placing them at the proper spacing and rotational orientation in a cast on fixture.

In the manufacture of wet cell storage batteries, alternate plates are encapsulated in microporous envelopes and pairs of encapsulated and bare plates are assembled into stacks, with each stack forming one cell of a battery. The plates have lugs projecting from their upper edges that are offset from the vertical center line of the plates. The plates in every other cell in a battery are rotated 180° with respect to the plates in adjacent cells so that the lugs in alternate cells are offset from one another. The lugs on the plates in each cell are interconnected by casting an electrically conductive strip onto them. The groups of plates for a battery are assembled in this alternating cell "battery configuration" in a "cast on" fixture, which supports the plates in the proper orientation while the straps are cast on them.

The process of encapsulating the plates, assembling them into stacks that will constitute a cell and placing the stacks in the cast on fixture in battery configuration has to a large degree become automated over the last several years. Johnson, U.S. Pat. No. 4,407,063, discloses an apparatus for encapsulating plates, and a later version of this apparatus combines encapsulated plates with noncapsulated plates in horizontally oriented pairs. Johnson et al., U.S. Pat. No. 4,824,307, discloses an apparatus that assembles the pairs and places them in vertically oriented stacks, each of which contains the proper number of plates to form a cell, and then transports the stacks to the cast on fixture. In addition, Tekmax Inc. of Tangent, Oreg., the assignee of Johnson, '063 and Johnson et al., '307, has produced and sold at least one plate handling apparatus that lifts the stacks out of the stacking apparatus and places them in the cast on fixture.

However, the separation between the stacks of plates in the stacking apparatus is greater than in battery configuration, and the prior art Tekmax handling apparatus cannot reduce the separation between the stacks of plates while they are being gripped by the apparatus. In addition, the prior art Tekmax handling apparatus cannot rotate alternate groups of plates to place them in battery configuration. Thus, hand manipulation is necessary after the stacks are placed in the cast on fixture. Another difficulty with the prior art Tekmax handling apparatus is that the fixture must be aligned with the handling apparatus which, due to space constraints, may not be desirable. Furthermore, the gripping heads on the prior art Tekmax apparatus have paired fingers that are moved together to grip a stack of plates and apart to release the stack by a parallelogram linkage that is activated by a pneumatic actuator. Thus, the fingers necessarily open and close at the same speed and with the same amount of force. As a result, a long stroke, high force actuator is necessary to achieve both the fast opening required for clean release of the stack and the high gripping force required to grip the stack and lift it. In addition, a parallelogram linkage is expensive to fabricate and maintain. Finally, with a parallelogram linkage, if cylinder pressure is lost the plates will be dropped and damaged.

The subject invention overcomes the foregoing shortcomings of the prior art Tekmax plate handling apparatus by providing an apparatus that grips a portion of the stacks of plates that will form a cell and raises them above the paddles of the plate stacking apparatus that transports them. The apparatus then rotates the gripped stacks 180° as a group and grips the remaining stacks from the plate stacking apparatus, with the stacks in the second group being interposed between the stacks in the first group. The apparatus then reduces the separation between the gripped stacks, moves them over the cast on fixture, lowers them into the fixture and releases them.

The gripping head of the apparatus include a pair of opposed cam elements that have separate cam faces for opening and closing. The cam elements are rotatably mounted and are moved between their gripping and release positions by raising and lowering a cam follower, which is interposed between them and is operated by a doubleacting pneumatic actuator. The cam faces that are used to close the fingers are arranged so that the stack of plates is not released upon loss of actuator pressure.

A plurality of gripping heads are slidably mounted in side-by-side pairs on tracks, except that the heads at one end of the apparatus are not slidable. The heads at the opposite end of the apparatus are attached to the piston of a linear actuator that moves them back and forth along the tracks. The gripping heads are connected together by chain links that are sized to prevent them from separating from one another by a distance that is greater than one-half of the distance between the pockets in the stacking apparatus that carries the stacks of plates. Thus, when the actuator piston is extended the heads are evenly spaced at their maximum separation. Bumpers on the gripping heads prevent them from coming closer together than the distance the stacks of plates are separated from one another in the cast on fixture. Thus, when the actuator piston is retracted, the heads are evenly spaced at their minimum separation.

The gripping heads are mounted on a platform that is movable back and forth along a beam that extends over the stacking apparatus and the cast on fixture. The platform also can be raised and lowered and rotated 180°.

Accordingly, it is a principal object of the subject invention to provide an apparatus that will lift a group of spaced-apart vertical stacks of plates, reduce the separation between the stacks in the group and deposit the group of stacks at a remote location.

It is a further object of the subject invention to provide such an apparatus which causes a portion of the stacks in the group to be 180° opposed from the remaining stacks when the group is deposited.

It is a still further object of the subject invention to provide such an apparatus wherein the gripping heads used to lift the stacks utilize cam elements that are positively moved between their open and closed positions by linear movement of a cam follower.

It is a yet further object of the subject invention to provide such an apparatus in which the fingers in the gripping head are opened more quickly than they are closed.

It is a further object of the subject invention to provide such an apparatus in which the fingers in the gripping heads will not open if pressure is lost at the actuator that operates the cam follower.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 3 is an end elevation view of the gripping heads of FIG. 2.

FIG. 5 is a side elevation view, at a further enlarged scale, of an individual gripping head as the gripping fingers are being opened.

FIG. 6 is a side elevation view, similar to FIG. 5, of an individual gripping head as the gripping fingers are being closed.

DETAILED DESCRIPTION OF A PREFERRED EMBODIMENT

Figure 1:
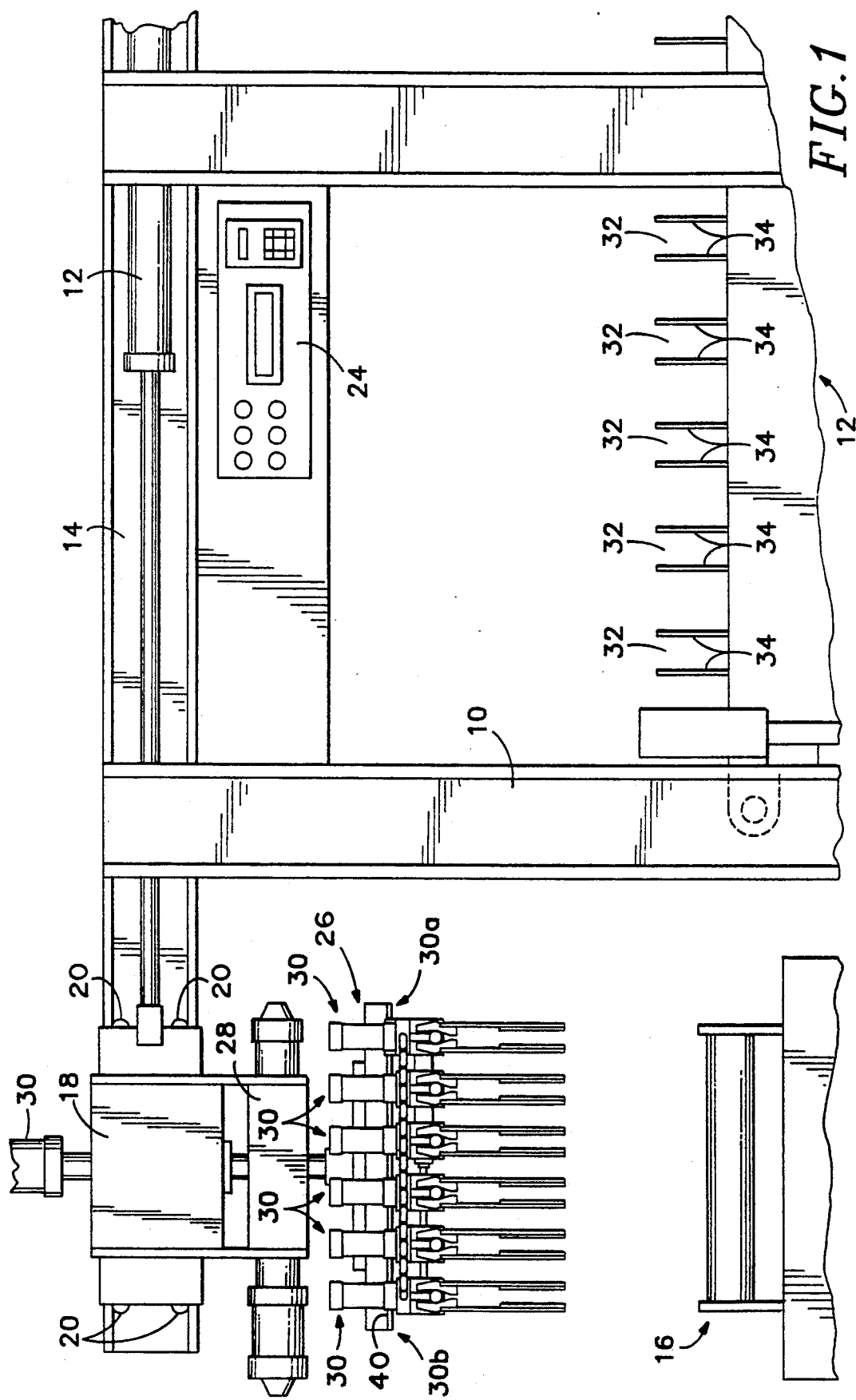
FIG. 1 is a fragmentary side elevation view of a plate handling apparatus embodying the features of the subject invention.

Referring to FIG. 1 of the drawings, a preferred embodiment of the present invention comprises a frame 10 that overlies a battery plate stacking apparatus 12, such as that disclosed in Johnson et al., U.S. Pat. No. 4,824,307. Mounted on the frame is a longitudinal beam 14 which lies above the center of the stacking apparatus and extends over a fixture 16 which carries a plurality of stacks of battery plates while a strap is cast onto their protruding lugs. A carriage 18 is slidably mounted on the beam 14 by means of rollers 20, and is movable back and forth along the beam by means of a double-acting linear actuator 22 which receives pressurized air from an appropriate source and lines (not shown). The actuator 22 is operated through a control panel 24 located on the apparatus. Suspended from the carriage 18 is a platform 26 that is rotatable through a commercially available pneumatically operated rotation mechanism 28, that also is operated by the control panel 24. The carriage 18 is attached to the platform 26 by a double-acting linear actuator 2 which also is operated by the control panel 24.

Figure 2:
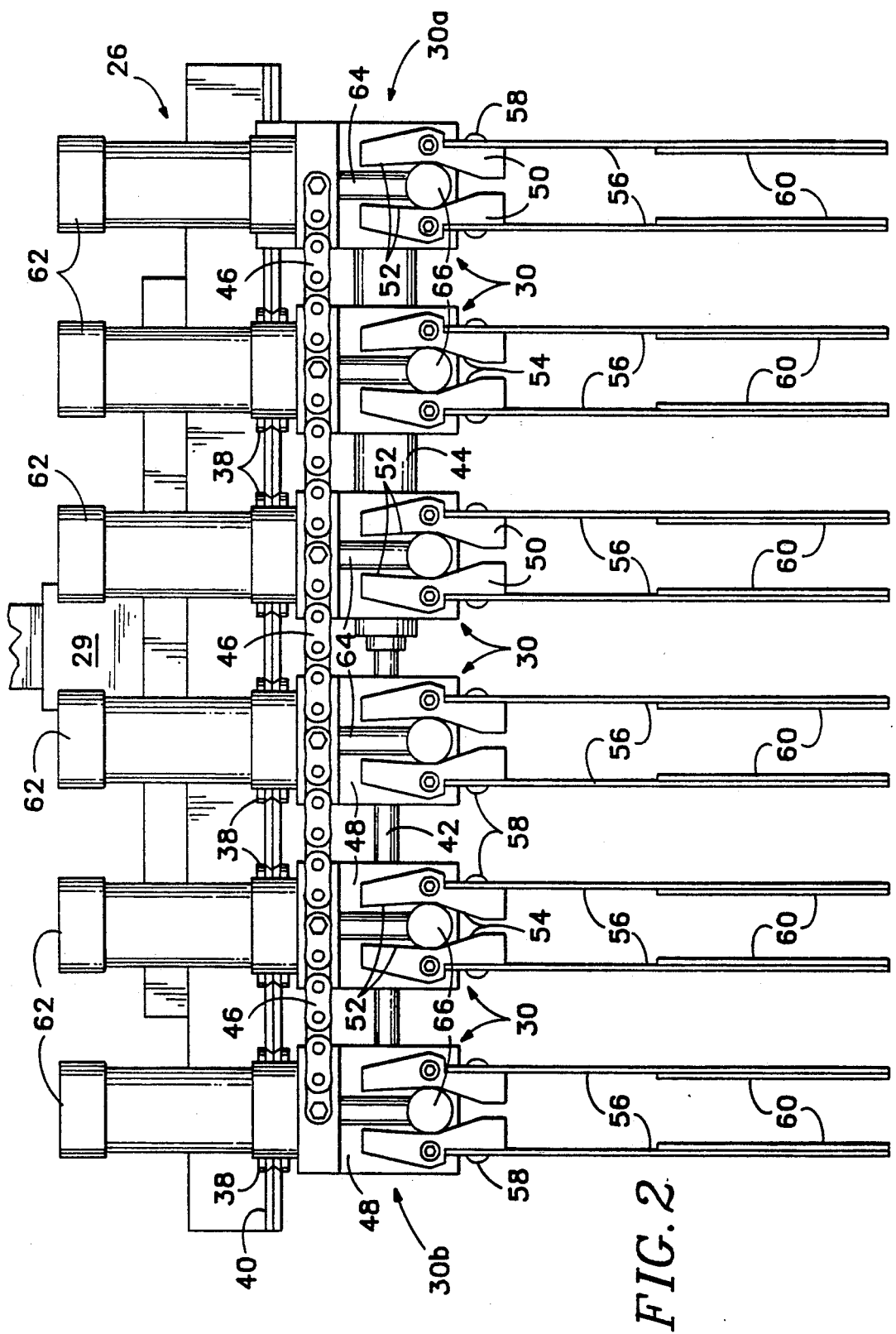
FIG. 2 is a side elevation view, at an enlarged scale, showing the gripping heads of the apparatus.
Figure 4:
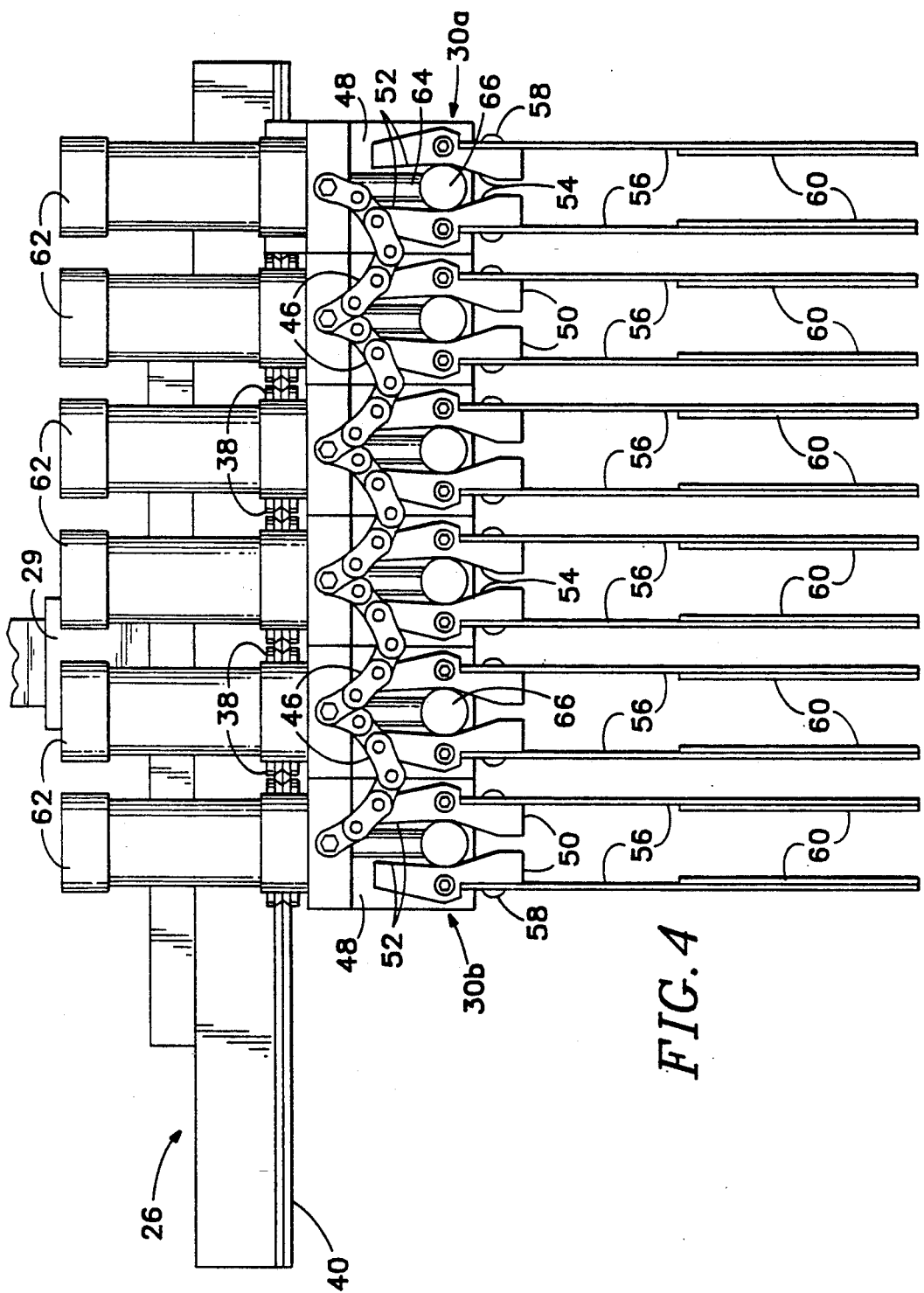
FIG. 4 is a side elevation view, similar to FIG. 2, showing the gripping heads at a reduced spacing.

Referring now also to FIGS. 2 and 3, the platform 26 carries a plurality of gripping heads 30 that engage stacks of plates that are being transported in the pockets 32 formed between adjacent paddles 34 of the stacking apparatus. The gripping heads are arranged in pairs with one gripping head in each pair being located on each side of the platform. Crossbars 36 tie the gripping heads in each pair together. Wheels 38, located on the inner side of each gripping head contact rails 40 located on the platform and permit the pairs of gripping heads to be moved back and forth along the platform. The gripping heads 30a at one end of the platform do not have wheels but are immovably attached to the platform. The gripping heads 30b at the other end of the platform are connected to the piston 42 of a linear actuator 44 that is mounted below the platform 26. The linear actuator 44 also is operated by the control panel 24. Each gripping head is connected to the adjacent gripping heads through a chain link 46 that prevents the gripping heads from being separated from one another by an amount greater than one-half of the distance between adjacent pockets 32 of the stacking apparatus when the piston 42 is extended, as shown in FIGS. 1 and 2. The body 48 of each gripping head serves as a bumper which operates in combination with the body of the adjacent gripping heads to prevent the gripping heads from moving closer together than the desired distance between groups of plates in the fixtures 16 when the piston 42 is retracted, as shown in FIG. 4.

Rotatably mounted to the body 48 of each gripping head is a pair of opposed cam elements 50. The cam elements 50 have inwardly facing first faces 52 at their upper ends and inwardly facing second faces 54 at the lower ends, with the first faces being generally disposed above the second faces. Extending downwardly from each cam element is a flat flexible finger 56. The finger 56 is attached to the cam element by means of a screw 58, thereby permitting its replacement. A pad 60 having a gripping surface is located at the lower extremity of each finger.

A double acting linear actuator 62, that also is operated by the control panel 24, is mounted on top of each gripping element. Attached to the piston 64 of each actuator 62 is a cam follower 66 which engages the cam faces 52, 54 on the pair of cam elements with which it is associated. When the actuator 62 is mid-stroke the cam follower 66 engages the cam elements between the first and second cam faces, and the fingers 56 are in a null position where they are parallel with one another in a vertical orientation. When the actuator is extended beyond its mid-stroke position the cam follower moves along the second cam faces and the cam elements rotate such that the fingers 56 move away from one another, FIG. 5. Conversely, when the actuator 56 is retracted from its mid-stroke position the cam follower moves along the first cam faces and the cam elements rotate such that the fingers move toward one another, FIG. 6. The cam faces in each pair define a ramp angle between them when the cam elements are in their null position, and the ramp angle $\Theta$ between the second cam faces is greater than the ramp angle $\beta$ between the first cam faces. Thus, the fingers close relatively slowly but exert a relatively high closing force, and open more quickly with a lower opening force. In addition, the shape of the first cam faces is such that when the fingers are fully open no force is fed back to the cam follower. Thus, even if the actuator were to lose pressure, the stack would not be released.

In operation, the actuator 44 is extended to place the gripping heads 30 at their maximum separation and the actuator 22 is retracted to position the gripping heads over the stacking apparatus 12. The actuator 30 is then extended in synchronization with the travel of the pockets 32 so that the fingers 56 of the odd numbered gripping heads, starting with the end gripping heads 30b, extend over the stacks of plates in the respective pockets. The actuators 62 associated with the odd numbered gripping heads are then retracted to rotate the fingers 56 toward one another and grip the stacks of plates therebetween. The platform 26 is raised until the gripped plates are above the paddles 34, and the rotation mechanism 28 is activated to rotate the stacks 180°. The platform 26 is then lowered again in synchronization with the travel of the pockets 32 so that the fingers 56 of the even numbered gripping heads extend over the next group of stacks which has advanced in the stacking apparatus, and these stacks are clamped between the respective fingers. The platform is then raised again until the plates are above the paddles 34 and the actuator 44 is retracted to place the gripping heads at their minimum separation. Simultaneously, the actuator 22 is extended to place the stacks of plates over the fixture 16. If, due to the layout of the assembly line, the fixture is not oriented parallel with the beam 14 the rotation mechanism is rotated to align the stacks of plates with the fixture. The platform is then lowered to place the stacks in the fixture and the actuators 62 are extended to release the stacks of plates. Thus, alternate stacks of plates are oriented in the fixture 180° opposed from one another and their lugs are offset in battery configuration. Finally, the platform is raised and the cycle is repeated.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A plate handling apparatus comprising:
   a frame;
   a platform movably supported by said frame;
   gripping means mounted on said platform for gripping a first group of vertically oriented stacks of rigid plates that are separated from one another by a predetermined distance, said gripping means comprising a plurality of gripping heads, each comprising:
   (a) a pair of opposed pivotally mounted cam elements each having a first and second cam face,
   (b) pivot means for mounting said cam elements,
   (c) an elongate gripping finger mounted on each of said cam elements,
   (d) a cam follower operably associated with said pair of cam elements,
   (e) means for moving said cam follower from a null position where the fingers associated with said pair of cam elements are in vertical spaced-apart parallel adjacency with one another in a first direction away from said pivot means along said first cam faces to cause said cam elements to rotate such that said fingers move toward one another to grip said plate, or in an opposite direction away from said pivot means along said second cam faces to cause said cam elements to rotate such that said fingers move away from one another to release said plate;
   platform raising means for raising the gripped stacks;
   means attached to said platform for reducing the separation distance between the gripping heads and thus the gripped stacks; and,
   said gripping means including means for releasing the gripped stacks for the separation distance therebetween has been reduced.

2. The plate handling apparatus of claim 1 wherein the respective cam faces of said pair of cam elements define a ramp angle when said pair of cam elements is in its null position, and the ramp angle of said second cam faces is greater than the ramp angle of said first cam faces.

3. The plate handling apparatus of claim 1 wherein there are two of said gripping heads for each stack of plates.

4. The plate handling apparatus of claim 1 wherein said gripping heads are mounted on a platform and said means for raising comprises a double-acting linear actuator that carries said platform.

5. The plate handling apparatus of claim 4 wherein said separation distance reducing means comprises:
   (a) a first end gripping head that is fixedly attached to said platform;
   (b) wheels located on the remainder of said gripping heads;
   (c) tracks on said platform which are engaged by said wheels;
   (d) means for moving the opposed end gripping head toward and away from said first end gripping head;
   (e) bumper means for preventing said gripping heads from moving toward one another when the separation therebetween reaches a preselected distance; and
   (f) restraining means for preventing said gripping hands from moving apart from one another beyond said predetermined distance.

6. The plate handling apparatus of claim 5 wherein said bumper means comprises blocks which pivotally carry said cam elements.

7. The plate handling apparatus of claim 5 wherein said restraining means comprises chain links which connect each gripping head to its adjacent gripping heads.

* * * * *

UNITED STATES PATENT AND TRADEMARK OFFICE
CERTIFICATE OF CORRECTION

PATENT NO. : 5,102,287
DATED : April 7, 1992
INVENTOR(S) : David A. Johnson, et. al.

It is certified that error appears in the above-indentified patent and that said Letters Patent is hereby corrected as shown below:

Column 3, line 45, after actuator, delete "2" and insert --29--.

Column 6, line 8, claim, 1, delete "for" and insert --after--.

Signed and Sealed this

Twenty-eighth Day of September, 1993

Attest:

BRUCE LEHMAN

Attesting Officer

Commissioner of Patents and Trademarks